US 9,258,789 B2

United States Patent
Ho et al.

(10) Patent No.: US 9,258,789 B2
(45) Date of Patent: Feb. 9, 2016

(54) METHOD FOR THE REDUCTION OF PILOT POWER TRANSMISSION IN MOBILE COMMUNICATION SYSTEMS

(75) Inventors: Ming-Ju Ho, Alpharetta, GA (US);
Clinton Harper, Atlanta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 1434 days.

(21) Appl. No.: 12/251,148

(22) Filed: Oct. 14, 2008

(65) Prior Publication Data

US 2010/0091718 A1 Apr. 15, 2010

(51) Int. Cl.
*H04M 1/00* (2006.01)
*H04B 1/38* (2015.01)
*H04W 52/32* (2009.01)

(52) U.S. Cl.
CPC .............. *H04W 52/325* (2013.01); *Y02B 60/50* (2013.01)

(58) Field of Classification Search
USPC ........................................................ 455/574
See application file for complete search history.

(56) References Cited

U.S. PATENT DOCUMENTS

| | | | | |
|---|---|---|---|---|
| 5,963,583 A | * | 10/1999 | Davidovici et al. | 375/130 |
| 6,366,602 B1 | * | 4/2002 | Raitola | 375/135 |
| 6,914,889 B1 | * | 7/2005 | Bi et al. | 370/318 |
| 7,983,622 B1 | * | 7/2011 | Vaughan | 455/67.16 |
| 2006/0146948 A1 | * | 7/2006 | Park et al. | 375/260 |
| 2006/0199544 A1 | * | 9/2006 | Ramakrishna et al. | 455/67.11 |
| 2007/0191051 A1 | * | 8/2007 | Suonvieri | 455/522 |
| 2009/0124206 A1 | * | 5/2009 | Kwon et al. | 455/63.1 |
| 2010/0022266 A1 | * | 1/2010 | Villier et al. | 455/522 |
| 2013/0128812 A1 | * | 5/2013 | Marsh et al. | 370/328 |

* cited by examiner

*Primary Examiner* — Ankur Jain
(74) *Attorney, Agent, or Firm* — Amin, Turocy & Watson, LLP

(57) ABSTRACT

The innovation relates to a system and/or methodology for the reduction of pilot power transmission in mobile communication systems. More specifically, the innovation relates to varying the transmit power of a pilot signal to increase the power available to other services, such as customer voice and data communication. In addition, reducing the transmit power of the pilot signal can reduce or militate against interference with the pilot signals of neighboring or nearby cells.

20 Claims, 9 Drawing Sheets

METHOD FOR THE REDUCTION OF PILOT POWER TRANSMISSION IN MOBILE COMMUNICATION SYSTEMS

TECHNICAL FIELD

The subject invention relates generally to mobile communication systems, and more particularly to apparatus and methodologies for varying the transmission power of pilot signals for the management of user devices.

BACKGROUND

Optimization of network coverage and service quality are constant goals for wireless network operators. Superior coverage and service quality results in enhanced user experiences, greater throughput, and ultimately increased revenue. A couple ways to achieve superior coverage and service quality are through increasing the power available to customer voice and data communication services, and reducing the interference between neighboring cells.

Mobile communication systems typically require a pilot signal (also known as a beacon signal) to be transmitted from a base station in order to provide information to mobile user devices. The information is usually related to the expected signal strength a mobile device might receive if served by the base station, although other system information can be derived from the pilot signal as well.

One example communications standard, WCDMA/UMTS, transmits what is known as a Common Pilot Channel (CPICH). The pilot channel is transmitted at full power, with no provision for power control, typically, 6% of the base station power is allocated to the CPICH. This represents a large fraction of downlink transmit power that is not available for to support customer voice or data traffic. Unfortunately, current communication standards do not provide for any systems or methodologies for reducing the transmit power required for pilot or beacon signals.

SUMMARY

The following presents a simplified summary of the disclosure in order to provide a basic understanding of some aspects of the full written description. This summary is not an extensive overview of the disclosure. It is not intended to identify key/critical elements of the invention or to delineate the scope of the invention. Its sole purpose is to present some concepts of the invention in a simplified form as a prelude to the more detailed description that is presented later.

In one embodiment, a wireless communication system, including a base station that transmits at least one pilot signal, and a beacon component that can vary the transmit power of the pilot signal is disclosed. In an additional embodiment, a method facilitating wireless communication is disclosed, including transmitting at least one pilot signal, and varying the transmit power of the pilot signal. In yet another embodiment, a system facilitating wireless communication is disclosed, including means for transmitting at least one pilot signal, and means for varying the transmit power of the pilot signal.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
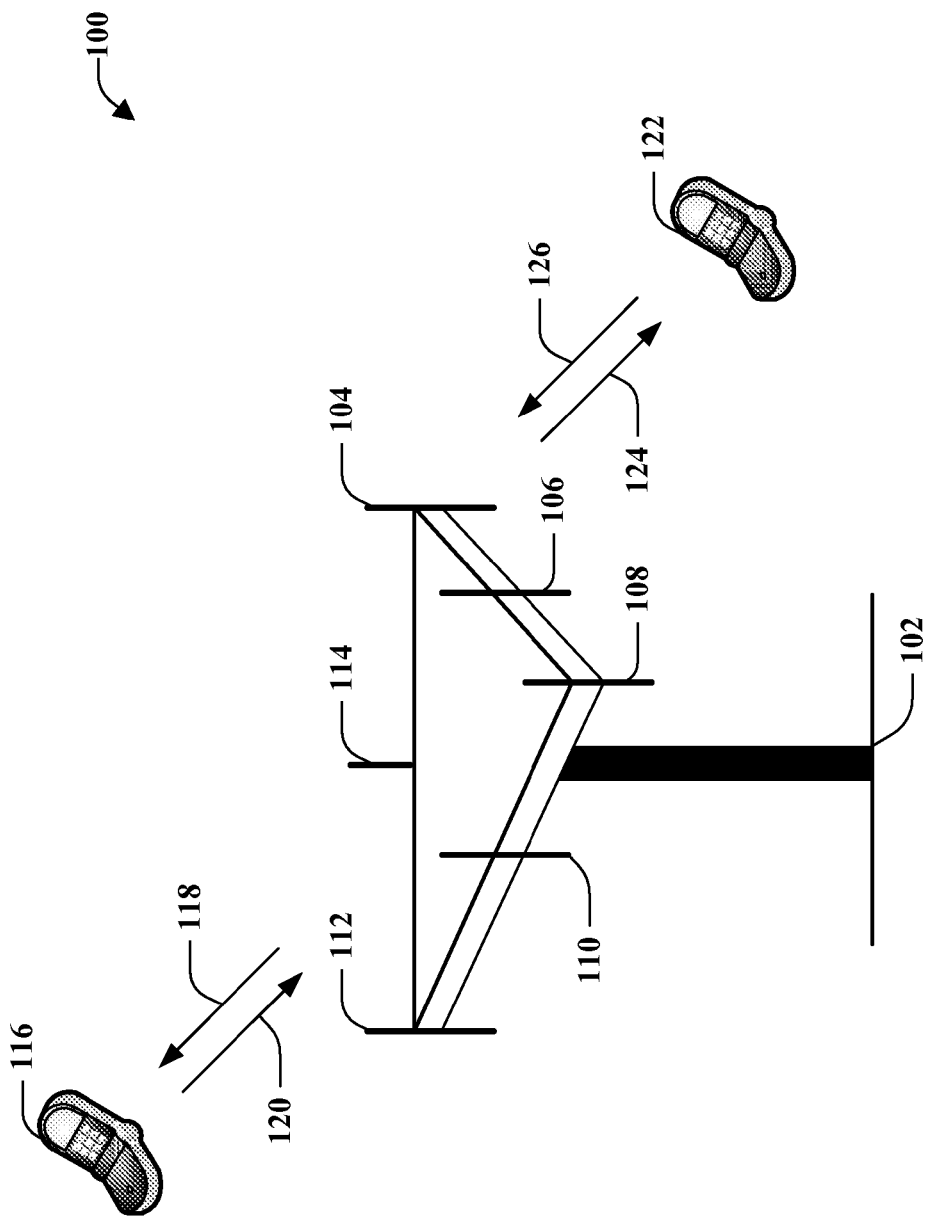
FIG. 1 illustrates an exemplary multiple access wireless communication system in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident; however, that such matter can be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Referring initially to the drawings, FIG. 1 Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. This can be provided by using a precoder to steer signals in desired directions, for example. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example.

According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like. Moreover, the system 100 can be a multiple-bearer system. A bearer can be an information path of defined capacity, delay, bit error rate, etc. Mobile devices 116 and 122 can each serve one or more radio bearers. The mobile devices 116 and 122 can employ uplink rate control mechanisms to manage and/or share uplink resources across the one or more radio bearers. In one example, the mobile devices 116 and 122 can utilize token bucket mechanisms to serve the radio bearers and to enforce uplink rate limitations.

Pursuant to an illustration, each bearer can have an associated prioritized bit rate (PBR), maximum bit rate (MBR) and guaranteed bit rate (GBR). The mobile devices 116 and 122 can serve the radio bearers based, at least in part, on the associated bit rate values. The bit rate values can also be employed to calculate queue sizes that account for PBR and MBR for each bearer. The queue sizes can be included in uplink resource requests transmitted by the mobile devices 116 and 122 to the base station 102. The base station 102 can schedule uplink resources for mobile device 116 and 122 based upon respective uplink requests and included queue sizes.

Figure 2:
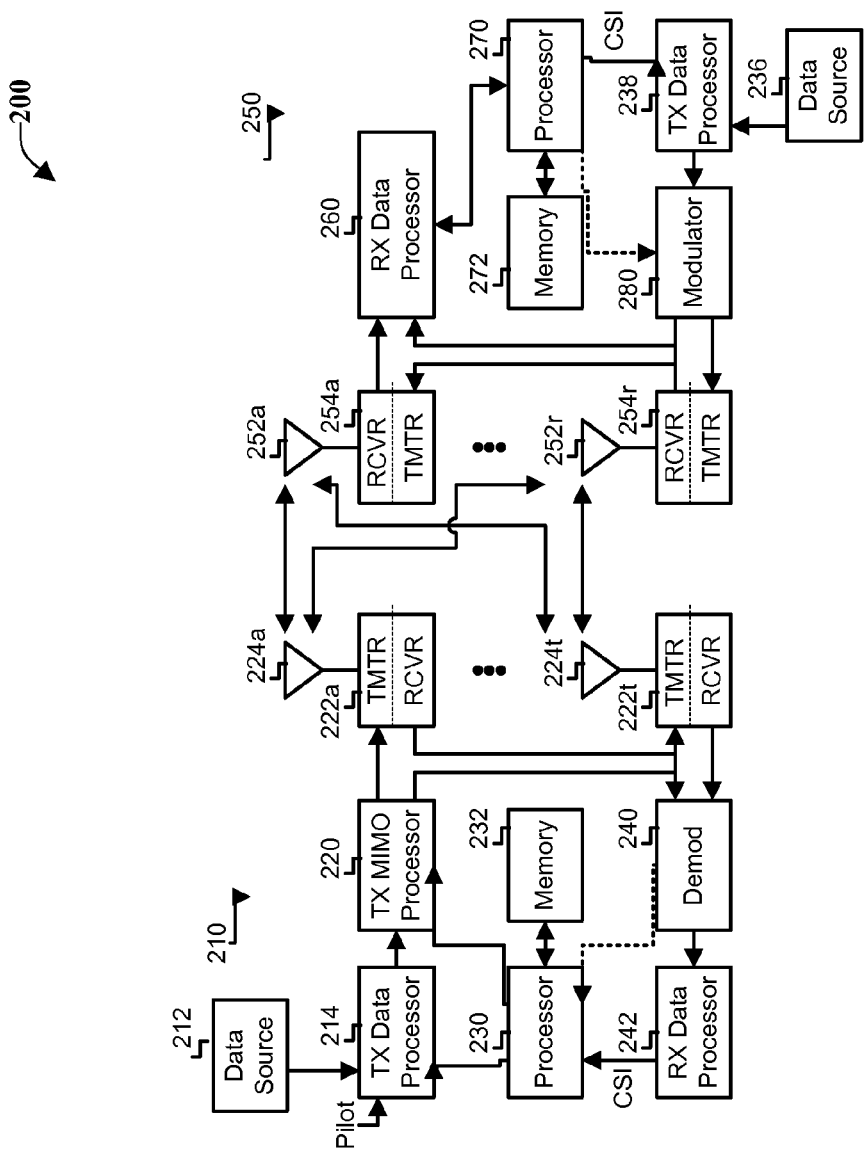
FIG. 2 illustrates a general block diagram of a communication system in accordance with an aspect of the subject specification.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmitter (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
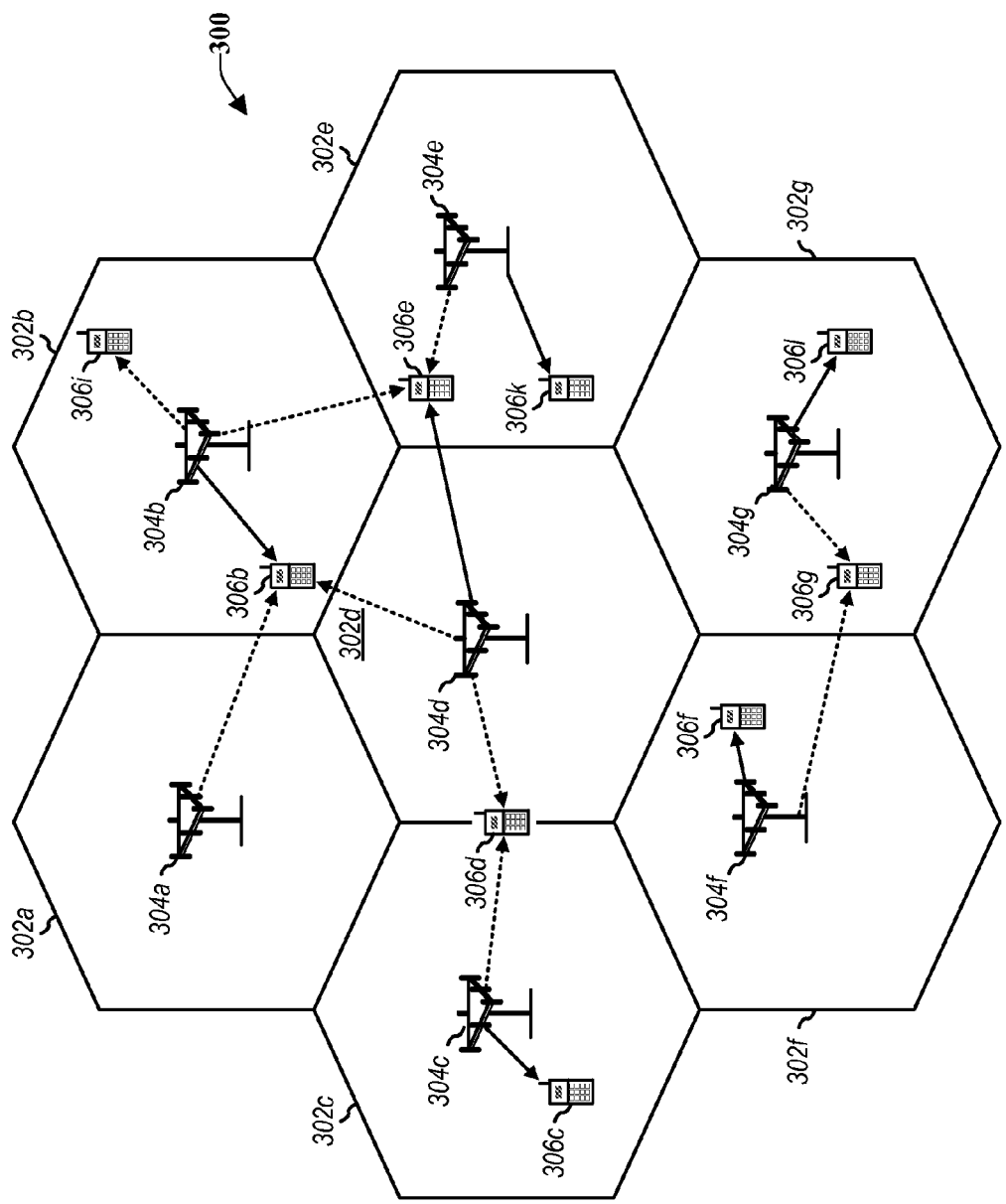
FIG. 3 illustrates an exemplary wireless communication system in accordance with an aspect of the subject specification.

FIG. 3 illustrates an exemplary wireless communication system 300 configured to support a number of users, in which various disclosed embodiments and aspects may be implemented. As shown in FIG. 3, by way of example, system 300 provides communication for multiple cells 302, such as, for example, macro cells 302a-302g, with each cell being serviced by a corresponding access point (AP) 304 (such as APs 304a-304g). Each cell may be further divided into one or more sectors (e.g. to serve one or more frequencies). Various access terminals (ATs) 306, including ATs 306a-306k, also known interchangeably as user equipment (UE) or mobile stations, are dispersed throughout the system. Each AT 306 may communicate with one or more APs 304 on a forward link (FL) and/or a reverse link (RL) at a given moment, depending upon whether the AT is active and whether it is in soft handoff, for example. The wireless communication system 300 may provide service over a large geographic region, for example, macro cells 302a-302g may cover a few blocks in a neighborhood.

The cells 302 can provide coverage via a plurality of networks, such as GSM/GPRS/Edge network (hereinafter referred to as "2G network"), and/or UMTS network (hereinafter referred to as "WCDMA coverage," "3G network," or simply as "3G"). The cells 304a-304g each transmit a pilot signal (e.g. pilot channel, beacon signal, etc.). The pilot signals are transmitted from the base stations to the UEs (306a-306l) to provide information, such as an expected signal strength, and so forth. Typically, the pilot signal is constantly transmitted at full power, without provisions for power control. For example, in a WCDMA/UMTS network more than 6% of the base station power is allocated for the pilot signal. It can be appreciated that this represents a large fraction of downlink transmit power that can be used for alternative services, such as customer voice or data traffic. In addition, since every base station transmits a pilot signal, depending on the terrain or environment, the pilot signals can be a source of interference for neighboring base stations. For example, the pilot signal transmitted by base station 304d can interfere with the pilot signals transmitted from the base stations 304a and 304b, because the terrain may allow for the base station's 304d pilot signal to propagate into the transmission range of the neighboring base stations 304a and 304b.

Figure 4:
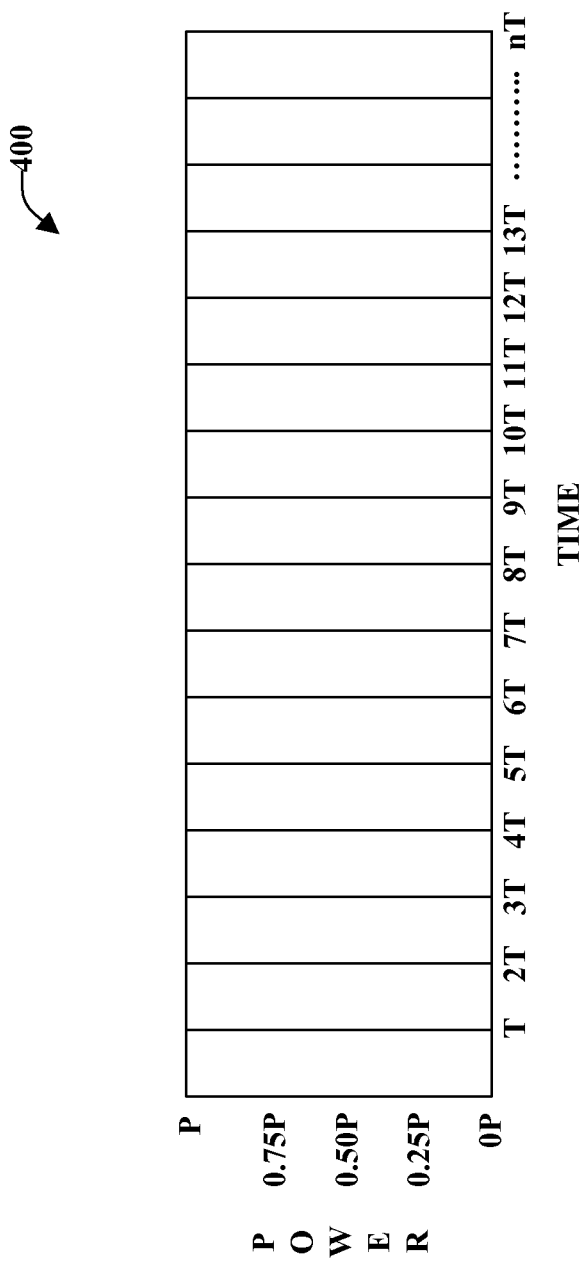
FIG. 4 illustrates an example graph of constant transmit power of a typical pilot signal in accordance with the subject specification.

FIG. 4 is an example bar graph 400 illustrating the transmission power of a typical pilot signal. The bar graph 400 has a horizontal-axis (e.g. x-axis) representing time (T) and a vertical-axis (e.g. y-axis) that represents the transmission power (P) of the pilot signal at a given T. As previously discussed, typical pilot signals are transmitted at a constant power or full power (e.g. P) continuously. For instance, the example pilot signal shown in the graph 400 is transmitted at full power P from time T to nT, where n is an integer.

A transmission technique such as the one shown in the graph 400 can lead to a number of results. First, continuously transmitting the pilot signal at full power P, can reduce the overall power remaining for other functionality. For example, in a WCDMA/UMTS network, where there is only a single carrier per base station, the power used for the pilot signal is unavailable for additional or alternative services, such as customer voice or data service. Secondly, in a plurality of network types the pilot signals of multiple base stations can be transmitted on the same frequency, thereby causing interference to occur between pilot signals where the range extends into other cells (see FIG. 3).

Figure 5:
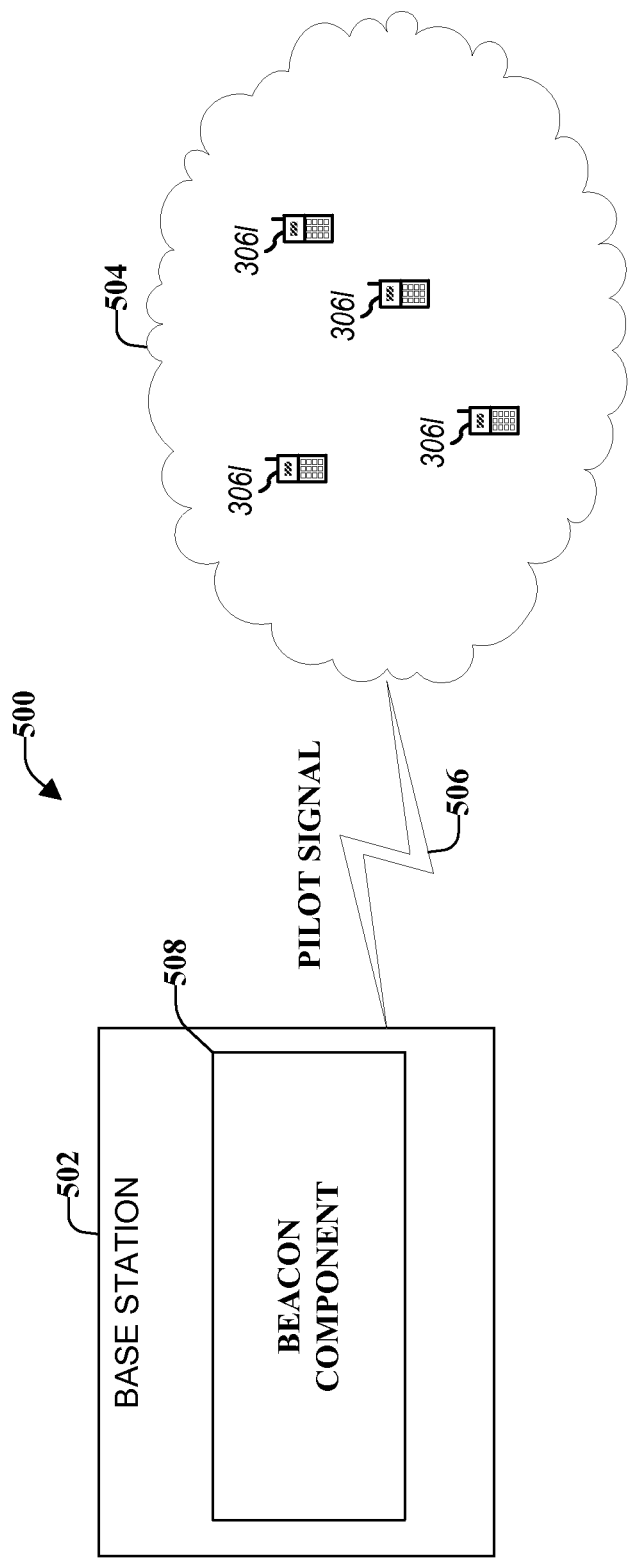
FIG. 5 illustrates an example general component block diagram of a wireless network in accordance with the subject specification.

FIG. 5 illustrates an example wireless communication system 500 in accordance with one or more aspects of the subject innovation. The system 500 includes a base station 502, and one or more UEs 504 (504a-504d). In operation, the base station 502 continuously transmits a pilot signal 506. The UEs 504 seek, sniff, or otherwise detect the pilot signal 506 as required. The UEs 504 can derive system information from the pilot signal, such as an expected signal strength. For instance, when the UE 504a comes in range of the base station 502 it can determine the presence of the pilot signal 506. Based on the pilot signal 506 the UE 504a can determine the expected signal strength from the base station 502, and based on the expected signal strength determine whether to connect to the base station 502 or continue looking for additional connection points.

The base station 502 includes a beacon component 508. The beacon component 508 controls the transmission of the pilot signal 506. As previously discussed, typically pilot signals 506 are transmitted at a constant power or full power. However, the beacon component 508 can vary the power at which the pilot signal 506 is transmitted. The beacon component 508 can vary the transmission power of the pilot signal 506 based on a predetermined power transmit sequence (discussed infra). Also, the UEs 504 can have prior knowledge (e.g. built-in, firmware, etc.) of the transmission sequence that allows the UEs 504 to perform in the same manner as if the pilot signal 506 was transmitted at a constant level.

Additionally or alternatively, the beacon component 508 can encode the power transmit level (e.g. attenuation) in the pilot signal 506. Wherein the UEs 504 can decode the power transmit level of the pilot signal 506, and still achieve performance capabilities similar to that of a pilot signal 506 that is transmitted at a constant level. For example, the beacon component 508 can determine the power transmit level of the pilot signal 506 using a pseudo-random sequence, and encode the pseudo-random sequence in the pilot signal 506. The UEs 504 can receive the pilot signal 506, decode the psudo-random sequence, and follow along with the attenuation of the pilot signal 506. It is to be appreciated that this is but one example of how the beacon component 502 can determine the power transmit level of the pilot signal 506, and that a number of techniques are capable within the scope and spirit of the subject innovation.

Figure 6:
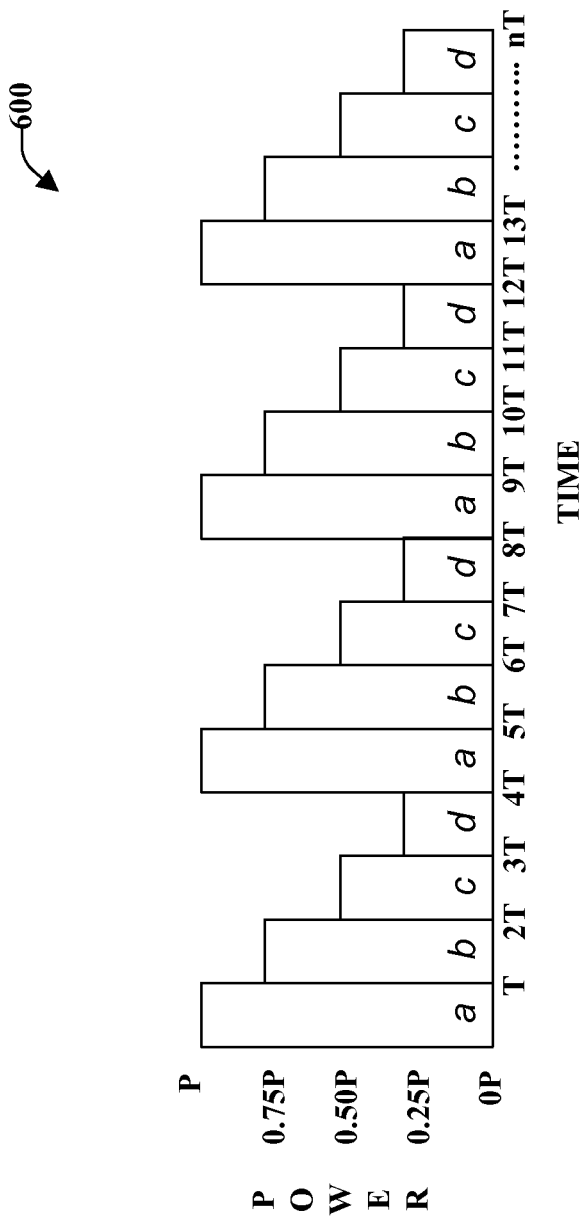
FIG. 6 illustrates an example graph of varying transmit power of a pilot signal using a predetermined sequence in accordance with an aspect of the subject specification.

Referring now to FIG. 6 a bar graph 600 illustrating an example pilot signal's varying transmit power in accordance with an aspect of the present innovation is shown. The bar graph 600 has a horizontal-axis (e.g. x-axis) representing time (T) and a vertical-axis (e.g. y-axis) that represents the transmission power (P) of the pilot signal at a given T. In this example, the transmit power of the pilot signal is at full power at a time T. The power is decreased (by 0.25P) each T, wherein after 4T the transmit power returns to P and the sequence is repeated until a time nT, where n is an integer.

Figure 7:
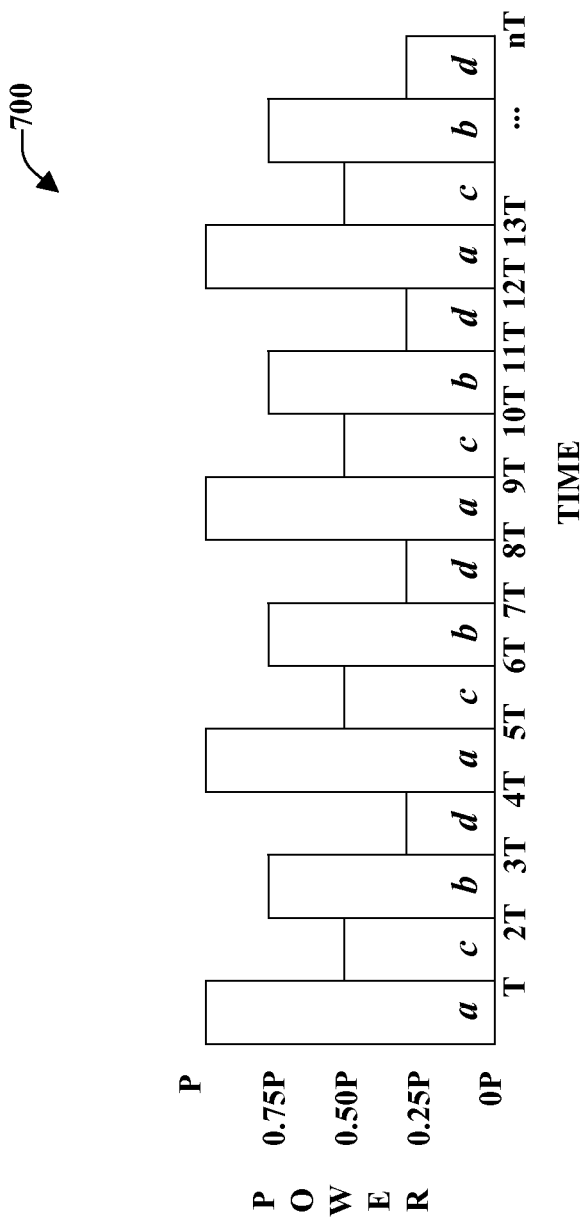
FIG. 7 illustrates an example graph of varying transmit power of a pilot signal using a pseudo-random sequence in accordance with an aspect of the subject specification.

Turning to FIG. 7, an example bar graph 700 illustrating a pilot signal's varying transmit power in accordance with an aspect of the present innovation is shown. The bar graph 700 has a horizontal-axis (e.g. x-axis) representing time (T) and a vertical-axis (e.g. y-axis) that represents the transmission power (P) of the pilot signal at a given T. In this example, the transmit power of the pilot signal is at full power at a time T. The power is varied using a sequence, such as a pseudo-random sequence, wherein after 4T the transmit power returns to P and the sequence is repeated until a time nT, where n is an integer.

Figure 8:
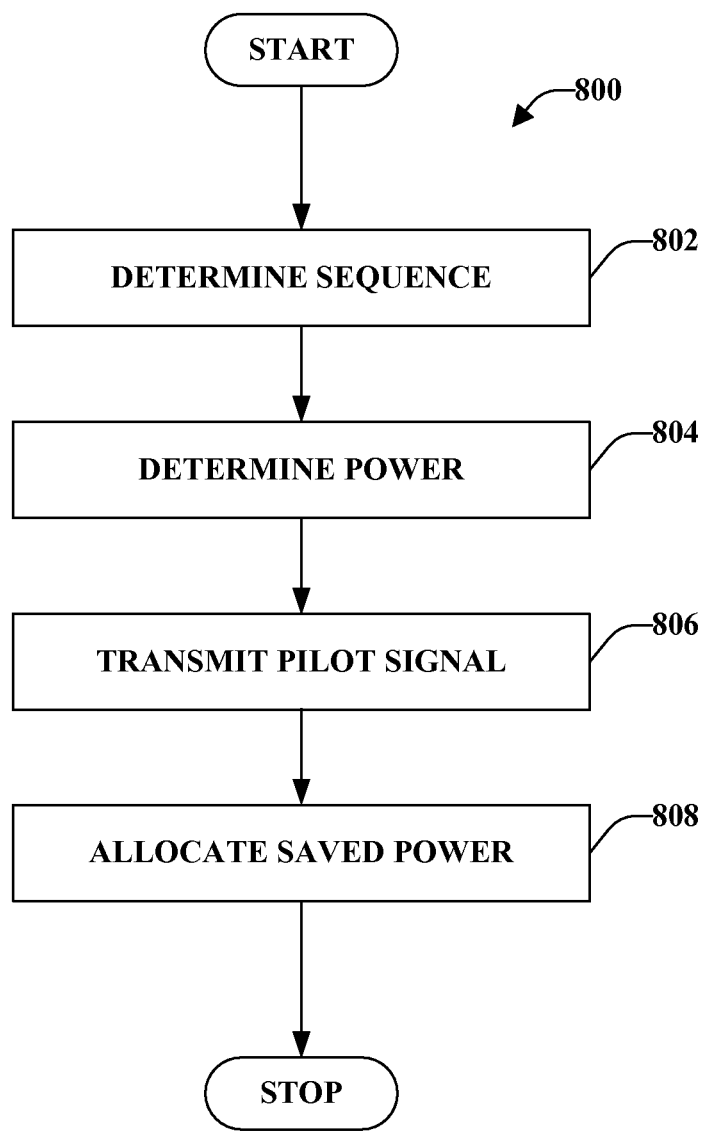
FIG. 8 illustrates an example methodology facilitating the reduction of pilot power transmission is shown in accordance with an aspect of the current specification.

In view of the exemplary systems described supra, a methodology that may be implemented in accordance with the disclosed subject matter will be better appreciated with reference to the flow chart of FIG. 8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, the illustrated blocks do not represent all possible steps, and not all illustrated blocks may be required to implement the methodologies described hereinafter.

Referring now to FIG. 8, an example methodology facilitating the reduction of pilot power transmission is shown in accordance with an aspect of the current innovation. At 802, a sequence for varying the transmission power of a pilot signal is determined (discussed supra). For instance, the transmission power of the pilot signal can be varied according to a predetermined to sequence. Additionally or alternatively, the transmission power of the pilot signal can be varied using a pseudo-random sequence. At 804, the transmit power of the pilot signal is determined according to the sequence determined at 802. In addition, the pilot signal can be encoded with the sequence so that it can be decoded by one or more UEs that do not have prior knowledge of the sequence.

At 806, the pilot signal is transmitted at the power level determined at 804. As previously discussed, varying the transmission power can reduce interference with neighboring cells and/or save power that can be allocated for other uses. At 808, the power saved by varying the transmit power of the pilot signal can be allocated for additional functionality, including but not limited to customer voice and/or data service.

Figure 9:
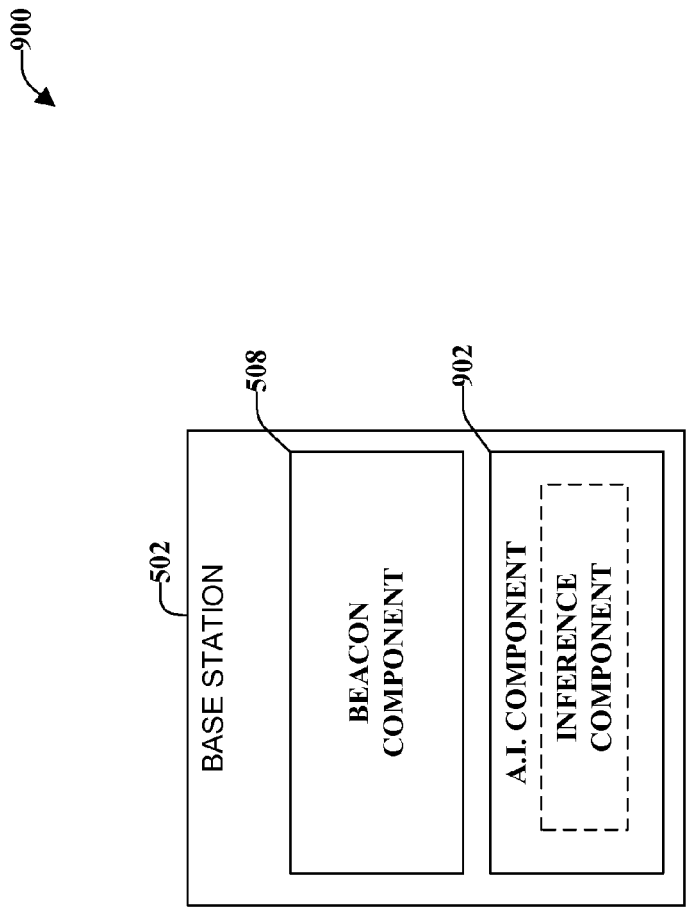
FIG. 9 illustrates an approach that employs an artificial intelligence component which facilitates automating one or more features in accordance with an alternative specification.

FIG. 9 illustrates an approach 900 that employs an artificial intelligence (AI) component 902 which facilitates automating one or more features in accordance with the subject invention. The subject invention (e.g., in connection with inferring) can employ various AI-based schemes for carrying out various aspects thereof. For example, a process for varying the transmit power of a pilot signal be facilitated by artificial intelligence.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. For instance, depending on the implementation a confidence can be assigned to the set of criteria, and an inference can be made as to the criteria that should be used as triggers for adding dithering.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., primary versus secondary, static versus dynamic, . . . ), and at what time of day to implement tighter criteria controls (e.g., in the evening when system performance would be less impacted).

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A base station device, comprising:
a processor; and
a memory that stores executable instructions that, when executed by the processor, facilitate performance of operations, comprising:
selecting, from a first amount of available power predetermined to be available for a transmission of a pilot signal by the base station device and based on a pseudo-random sequence, a second amount of transmission power to apply to the transmission of the pilot signal, wherein the pilot signal comprises data describing a parameter of the base station device;
initiating a classifier function, by the base station device, that is implicitly trained to determine, according to a predetermined criterion, when to update a previously inferred schema related to the transmission of the pilot signal resulting in an updated schema, and wherein the classifier function adjusts the predetermined criterion as a function of an inference made based upon a type of data being processed resulting in an adjusted criterion;
encoding, by the base station device, a power transmit level associated with the second amount of the transmission power based on the updated schema and the adjusted criterion; and
utilizing, by the base station device, unused power from the amount of available power saved as a result of the selecting for a set of services.

2. The base station device of claim 1, wherein the pilot signal indicates an expected signal strength to a mobile device.

3. The base station device of claim 1, wherein the operations further comprise encoding the pseudo-random sequence in the pilot signal to indicate an attenuation of the transmission power.

4. The base station device of claim 1, wherein a preset amount of transmission power is made available for the set of services by the base station device.

5. The base station device of claim 4, wherein the unused power from the first amount of available power saved as the result of the selecting is allocated for voice communication.

6. The base station device of claim 1, wherein the operations further comprise generating the pseudo-random sequence.

7. The base station device of claim 1, wherein the transmission powers of transmissions of the pilot signal are reduced to reduce an amount of interference with transmissions from another base station device.

8. A method, comprising:
initiating, by a system including a processor, transmitting a pilot signal that comprises data representing a parameter of a base station device;
determining, by the system, a transmission power applicable to the transmitting of the pilot signal as a function of a pseudo-random sequence and a preset transmission power available to apply to the pilot signal;
initiating, by the system, a classifier function that is explicitly trained to determine, according to a predetermined criterion, when to refine a previously inferred schema related to the transmitting of the pilot signal resulting in an updated schema, and wherein the classifier function adjusts the predetermined criterion as a function of an inference made based upon a type of data being processed resulting in an adjusted criterion;
encoding, by the system, transmission power data representative of the transmission power available to apply to the pilot signal based on the updated schema and the adjusted criterion; and
allocating, by the system, unused power of the preset transmission power, remaining after the transmitting as a result of the determining, for a set of services.

9. The method of claim 8, further comprising specifying, by the system, an expected signal strength using the pilot signal.

10. The method of claim 8, further comprising initiating, by the system, transmitting the pseudo-random sequence to provide alteration data representing alterations of different transmission powers of the pilot signal to a network device.

11. The method of claim 8, wherein the initiating of the transmitting of the pilot signal comprises initiating transmitting the pilot signal from the base station device utilizing the transmission power, and initiating transmitting the set of other services from the base station device utilizing at least a portion of the power saved.

12. The method of claim 8, wherein the allocating of the power saved from the determining the transmission power for the pilot signal transmission for the set of services comprises allocating the second quantity of the power saved for voice communication.

13. The method of claim 8, wherein the allocating of the power saved from the determining the transmission power for the pilot signal transmission for the set of services comprises allocating the second quantity of the power saved for data communication.

14. The method of claim 8, wherein the transmission power is a first transmission power, and further comprising determining, by the system, a second transmission power for a second pilot signal transmission as a function of the pseudo-random sequence and the preset transmission power.

15. The method of claim 8, wherein the determining the transmission power of the pilot signal transmission comprises reducing the transmission power of the pilot signal transmission to reduce an amount of interference with transmissions in a neighboring cell device.

16. A non-transitory machine-readable storage medium, comprising executable instructions that, when executed by a processor, facilitate performance of operations, comprising:
transmitting an encoded pilot signal that is a common signal comprising information describing a parameter of a network device;
determining transmission powers of transmissions of the encoded pilot signal as a function of a pseudo-random sequence, wherein the transmission powers of the transmissions employ power from a predetermined amount of available transmission power for the transmissions of the encoded pilot signal by the base station device;
receiving decoded data relating to a decoding of the encoded pilot signal that was performed by a user device;
initiating a classifier function that is implicitly or explicitly trained to determine, according to a predetermined criterion, when to update or refine a previously inferred schema related to the transmitting the encoded pilot signal resulting in an updated schema, and wherein the classifier function adjusts the predetermined criterion as a function of an inference made based upon a type of data being processed, resulting in an adjusted criterion, and a time of day; and
allocating a remaining amount of the available transmission power, determined to be remaining after the transmissions, based on the updated schema and the adjusted criterion, for a set of services.

17. The non-transitory machine-readable medium of claim 16, wherein the allocating of the remaining amount of the available pilot signal transmission power for the set of services comprises adding the remaining amount of available encoded pilot signal transmission power to a preset amount of power for the set of services.

18. The non-transitory machine-readable medium of claim 17, wherein the allocating of the remaining amount of the available decoded pilot signal transmission power for the set of services comprises allocating the remaining amount of the available encoded pilot signal transmission power for voice communication.

19. The non-transitory machine-readable medium of claim 18, wherein the allocating of the remaining amount of the available encoded pilot signal transmission power for the set of services comprises allocating the remaining amount of the available encoded pilot signal transmission power for data communication.

20. The non-transitory machine-readable medium of claim 16, wherein the determining the transmission powers of transmissions of the encoded pilot signal comprises reducing the transmission powers of transmissions of the encoded pilot signal to reduce an amount of interference with transmissions in a neighboring cell device.

* * * * *